(12) United States Patent
Kanzler

(10) Patent No.: US 6,505,897 B1
(45) Date of Patent: Jan. 14, 2003

(54) GROUSER FOR A CRAWLER CHAIN

(75) Inventor: Helmut Kanzler, Vöhringen (DE)

(73) Assignee: Kassbohrer Gelandefahrzeug AG, Laupheim (DE)

( * ) Notice: Subject to any disclaimer, the term of this patent is extended or adjusted under 35 U.S.C. 154(b) by 0 days.

(21) Appl. No.: 09/806,045

(22) PCT Filed: Jul. 21, 2000

(86) PCT No.: PCT/EP00/06998
§ 371 (c)(1),
(2), (4) Date: Jul. 5, 2001

(87) PCT Pub. No.: WO01/08963
PCT Pub. Date: Feb. 8, 2001

(30) Foreign Application Priority Data

Jul. 30, 1999 (DE) .................... 299 13 344 U

(51) Int. Cl.⁷ ............................................... B62D 55/28
(52) U.S. Cl. ............................................ 305/180; 305/160
(58) Field of Search .................... 305/180, 160, 305/161, 162, 187, 191, 192; 301/43

(56) References Cited

U.S. PATENT DOCUMENTS

| | | | |
|---|---|---|---|
| 2,022,567 A | * 11/1935 | Kegresse | 305/180 |
| 2,273,949 A | * 2/1942 | Galanot et al. | 305/180 |
| 3,561,825 A | * 2/1971 | Gibson et al. | 305/180 |
| 4,218,101 A | * 8/1980 | Thompson | 305/180 |
| 4,560,211 A | * 12/1985 | Van Der Lely | 305/180 |
| 5,033,801 A | * 7/1991 | Beeley | 305/180 |
| 5,199,771 A | * 4/1993 | James et al. | 305/180 |
| 5,201,574 A | 4/1993 | James et al. | |
| 5,265,949 A | 11/1993 | Haug | |
| 5,354,124 A | * 10/1994 | James | 305/180 |
| 5,466,056 A | * 11/1995 | James et al. | 305/180 |
| 5,641,214 A | * 6/1997 | Kafka | 305/180 |
| 5,690,398 A | * 11/1997 | Pribyl | 305/180 |
| 5,902,021 A | * 5/1999 | Jager | 305/180 |
| 5,951,125 A | * 9/1999 | Jager et al. | 305/180 |
| 6,296,330 B1 | * 10/2001 | Hall | 305/180 |

FOREIGN PATENT DOCUMENTS

WO    WO 88/02717    4/1988    ........... B62D/55/26

* cited by examiner

Primary Examiner—S. Joseph Morano
Assistant Examiner—Long Bao Nguyen
(74) Attorney, Agent, or Firm—Greenberg Traurig, P.C.

(57) ABSTRACT

The invention relates to a cleat assembly for drive tracks for tracked vehicles, in particular those used for grooming ski slopes. The cleat assembly has a cleat member that includes, in cross section, a U-shaped body as a connection shank and two U-shanks connected with the connection shank via a flex rim that fit together and end opposite to the connection shank by forming an end piece of the cleat member. The flex rim includes a roll bead that is positioned projecting essentially outward from the connecting shank and bent upward toward the end piece.

20 Claims, 2 Drawing Sheets

GROUSER FOR A CRAWLER CHAIN

BACKGROUND OF THE INVENTION

The invention relates to a cleat assembly for drive tracks for tracked vehicles, particularly for ski slope grooming, with a cleat member that includes an—in cross-section—essentially U-shaped base from a connection shank and two U-shanks connected with it via a flex rim that fit together and end opposite to the connection shank by forming an end piece of the cleat member.

Such a cleat assembly is known from DE 90 06 13 U and DE 29 602 940 by the same applicant. The cleat assembly is formed from shaped stock running perpendicular to the drive track, and is usually attached to the drive track so that it may be removed. After attachment, the end pieces are basically perpendicular to the drive track, and serve at least partially to grip the surface on which the tracked vehicle moves.

As the tracked vehicle moves over the surface, flexure in sections of the rubber drive track may be observed near the flex rim between the U-shanks and connection shanks. Because of these bends, damage to the drive track appears after a certain operating time because of the repeated flexure of the drive track over the flex rim.

SUMMARY OF THE INVENTION

The object of this application is to solve the task of improving the type of cleat assembly described at the outset so that is allows longer drive track service life with its simple and low-cost design.

This object is solved in connection with the features of the preamble of claim 1 in such a manner that the flex rim includes a roll bead that is projecting essentially outward from the connecting shank and bent upward toward the end piece. As the tracked vehicle moves, the drive track is no longer bent along the flex rim, but rather is bent along the roll bead. Thus, much less load is imposed on the drive track, and the service life of the drive track is increased in a simple, low-cost manner. In connection with this, one must be aware that corresponding deformations or bends in the drive track appear especially in the area of the track wheels, as well as in the area of the horizontally-mounted drive track, when the cleat assemblies are pressed toward the drive track. It has been noted that the cleat assembly based on the invention may be used both for drive tracks during winter use of the tracked vehicle and for so-called "summer drive tracks."

In order to form a roll bead without using a separate piece, the roll bead may be formed as one piece with the cleat element. In this case the flex rim known from the state of the art formed from the perpendicular meeting of connecting shank and U-shank may be expanded into a roll bead that projects outward and upward.

In order to be able to upgrade cleat assemblies already in use with a roll bead as necessary, the roll bead may be formed on at least one lateral end of a support washer locatable between the connecting shank and the drive track. In this manner, all tracked vehicles may be upgraded with cleat assemblies according to the state of the art as described by this invention. Further, there exists the option of providing properly-shaped roll beads on the support washer, depending on the used drive track and its potential flexure. That means that a roll bead of lesser size with a smaller crimping radius may be used for a small degree of drive track flexure in the direction of the cleat assembly.

Since a tracked vehicle may drive either forward or backward, corresponding flexures of the drive track relative to the cleat assembly may occur on both sides. To deal with this, the roll bead may be formed on both sides of the cleat member.

It is conceivable for a roll bead with simply-manufactured bend to be shaped like part of a circle, particularly with a quarter-circle shape, on its surface at least partially turned toward the drive track.

In order to maintain the same amount of bending or flexing of the drive track on both sides of the cleat member, the roll bead may be shaped with the same bend radius on both sides of the cleat member. In this case, the cleat member or the support washer is formed symmetrically with respect to the roll bead. It is equally possible to shape the roll bead to be asymmetrical in case the tracked vehicle drives preferably in one direction.

In order to provide adequate bending or flexing conditions for the drive track, the bend radius of the roll bead might be at least twice as great as the bend radius of the flex rim. The magnitude of the bend radius is determined by the track tension, track material, the ground, etc.

The cleat assembly across from the cleat member might have a lower support washer so that the drive track is arranged between the support washer and the cleat member or upper support washer to ensure simple and reliable attachment of the cleat assembly to the drive track.

Since the drive track may also evince bends or flexures in the area of the lower support washer, the lower support washer might include at least one roll bead on its lateral ends in an outward manner and bent away from the drive track corresponding to upper support washer.

Larger bends or flexures of the drive track than in the area of the upper support washer may occur near the lower support washer, especially near the track wheels of the tracked vehicle. Therefore, the roll beads on the upper and lower support washers may be configured with different bends. In order to simplify support washer manufacture, it is also conceivable that the roll beads be shaped the same on the upper and lower support washers.

In order to maintain a better connection between cleat assembly and drive track, the support washer on its lower side facing the drive track might include at least one projection extending and at least partially projecting in the longitudinal direction of the cleat assembly profile. This grips at least partially into the elastic drive track material. Further, such a projection may serve at least partially to prevent the intrusion of water, ice, or snow between the cleat assembly and drive track. Such material intruded between the cleat assembly and drive track may attack the surface of the drive track under certain weather conditions. Further, the clamping effect between the cleat assembly and drive track may be increased, which may prevent underside holes, for example.

Both above-mentioned effects of such a projection may be further improved if numerous such projections are arranged essentially parallel to one another on the underside.

A simple form of a support washer results if it is shaped essentially as a flat-bottomed tub with laterally arranged roll beads. The support washer may be manufactured from a suitable profile, as may the cleat member.

In order to enable a certain closing shape with respect to the cleat member when such a support washer is used, it is conceivable that the interior edges of the roll beads of the support washer may at least partially contact the U-shanks from the outside. In this manner, the cleat member is adjustable within the support washer so that it is held at least partially in proper position.

It is again emphasized that, depending on the application and usage conditions of the tracked vehicle, it is desirable for the roll bead bend radii at the ends of a support washer and/or of the upper and lower support washers to be different.

For a roll bead integrated directly into the cleat member, it is conceivable that the connection shank include at least one projection on its side facing the drive track. This acts similarly to the projection or projections on the underside of a support washer to improve grip on the drive track and at least partially prevent intrusion of water, snow, or ice in this area.

A simple embodiment example is conceivable in which a rim bead is integrated into the cleat member whereby the rim bead at the cleat member has an essentially flat upper side extending in the direction of the U-shank. This may extend perpendicular to the U-shank and blend into the U-shank via a bend at the end.

Particularly good grip to the drive track may conceivably also be achieved if the projections are arranged offset with respect to each other on the underside of the connection shank or the upper support washer and lower support washer.

In order to provide interchangeability for the upper and lower support washers, thus reducing manufacturing costs, the upper and lower support washers may be shaped identically.

A simple option for attaching the cleat assembly is conceivable in which the cleat member and/or upper support washer and/or lower support washer include a threaded hole used to secure the cleat assembly to the drive track.

One must note that it is possible according to the invention to use a cleat assembly based on the above-mentioned state of the art in which only the lower support washer is constructed according to the invention. In this case, a bending or flexure of the drive band over the relatively sharp flex rim of the cleat member results, however, on the inner surface of the drive track that bends and flexes more sharply, a guiding around the roll beads is achieved.

Regarding the materials of the cleat member and support washer, it must be mentioned that these may be selected based on the use of the tracked vehicle. For example, materials such as aluminum, steel, or alloys containing them for the cleat member, and the same materials as well as plastic for the support washers, may be recommended. Materials with similar characteristics may also be used for the cleat member and/or the support washer.

Advantageous embodiments of the invention are described in more detail using the accompanied drawings. It is shown in:

DETAILED DESCRIPTION OF THE DRAWINGS

Figure 1:
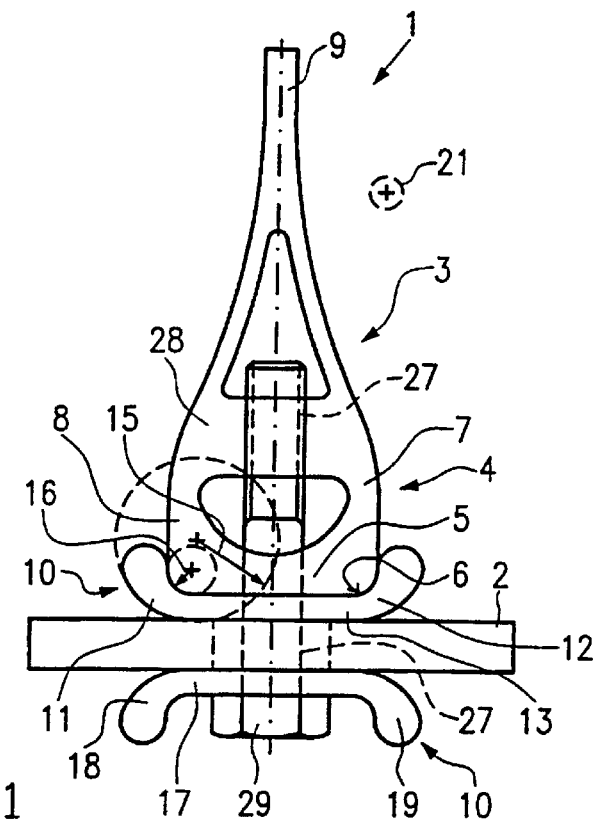
FIG. 1 a cross-sectional view through a cleat assembly based on a first embodiment of the invention.

FIG. 1 shows a cross-sectional view through a cleat assembly 1 based on a first embodiment of the invention. This is formed from a profile, that extends across a drive track 2 of a tracked vehicle (not shown). The cleat assembly includes a cleat member 3 and, at least one lower support washer 17 used to secure it to the drive track 2, and an upper support washer 13 as necessary.

The cleat member 3 includes a body 4 that is essentially U-shaped and consists of a connecting shank 5 and U-shanks 7, 8 extending upwards. The connecting shank 5 is connected to the U-shanks 7, 8 via a flex rim 6 that is given a relatively small bend radius 16. The U-shanks 7, 8 then extend upward to the connecting shank 5 essentially perpendicular to it, and then join to form an end piece 9 of the cleat member 3. One or more intermediate shanks 28 may be arranged as trusses between the U-shanks 7, 8.

The cleat member 3 and the support washers 13, 17 include threaded holes 27 used to connect them to the drive track 2, into which a bolt 29 may be threaded from the direction of the lower support washer 17, for example.

A lower end of the cleat member 3 and particularly of the connecting shank 5 is essentially positioned within the tub-shaped upper support washer 13. This piece includes a flat lower surface that rests on the drive track 2, on whose lateral ends 11, 12 of the support washer 13 roll beads 10 are formed. Relative to the base 23 (see FIGS. 4 and 5), they are bent outward and upward, and include the flex rims 6. The bend of the roll beads 10 is especially bent into a partial circle toward the application side facing the drive track 2. (see FIGS. 4 and 5). In the embodiments shown, the partial-circle bend represents approximately a quarter-circle. The bend radius 15 facing this bend is greater than that of the bend radius 16 facing the flex rim 6.

The lower support washer 17 similarly includes roll beads 10 on its lateral ends 18, 19. The upper and lower support washer 13, 17 may be shaped in the same manner. Not shown are embodiment examples based on the invention in which the bend radii of various roll beads of a support washer, or of the upper and lower support washer, are different, and the roll beads 10 are also differently shaped.

In the following embodiment examples, identical parts are designated with the same indices, and will only be referred to in part.

Figure 2:
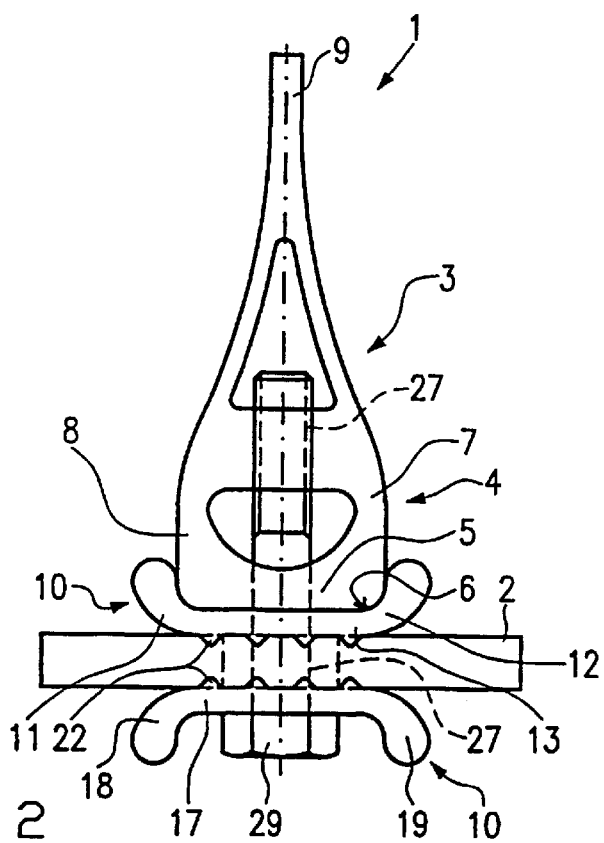
FIG. 2 a cross-sectional view similar to that in FIG. 1 through a second embodiment of the invention.

FIG. 2 shows a cross section similar to that in FIG. 1 through a second embodiment example of a cleat assembly 1 based on the invention. This one differs from the embodiment example of a cleat assembly in FIG. 1 particularly in that projections 22 are configured on one of the undersides of the upper or lower support washer 13, 17 facing the drive track 2. They extend along the longitudinal direction 21 (see FIG. 1) of the cleat assembly profile. The longitudinal direction 21 is perpendicular to the plane of the figure.

FIG. 2 shows four mutually-parallel projections 22 arranged on both support washers 13, 17, whereby a wavy, rippled, or otherwise textured underside of the support washers is provided, depending on the shape of the projections.

Figure 3:
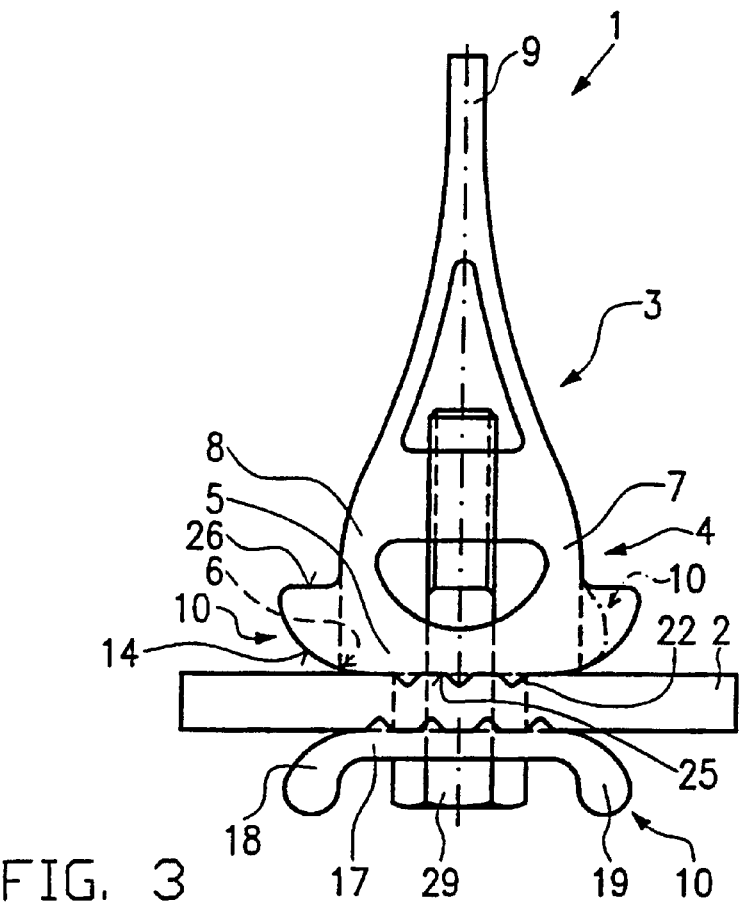
FIG. 3 a cross-sectional view similar to that in FIG. 1 through a third embodiment of the invention.

FIG. 3 shows a cross section similar to that in FIG. 1 through a third embodiment example. This one differs from the two previous embodiment examples in that the roll beads 10 are incorporated. into the cleat member 3. The roll beads 10 are essentially formed by a corresponding widening on the lower end of the U-shaped body 4 with bent application side 14 corresponding to the previous embodiment examples. In FIG. 3, the known travel of the U-shanks 7, 8 toward the connecting shank 5 is shown with a dashed line (see FIG. 1 and 2), whereby the flex rim 6 is formed at the connection between the U-shanks and connecting shank 5. It is clearly recognizable that considerably less bending or flexure of the drive track 2 (particularly in the area of track wheels) or bending of the drive track 2 resulting from a load on the cleat assembly 1 will result from positioning the roll bead 10 opposite the flex rim 6.

FIG. 3 further shows that the roll beads 10 need not be configured symmetrically. A roll bead may also be formed as shown by the dotted line. This applies similarly to both roll beads of the upper support washer or also to the roll beads of the lower support washer 17. Further, there exists the option that at least one roll bead may be shaped with an even greater bend radius so that a certain enlargement of the application surface from cleat member 3 or support washer 13, 17 simultaneously results relative to the drive track 2.

The roll beads 10 in FIG. 3 include a basically flat upper surface 26 that moves toward the U-shanks 7, 8 where it passes over a bend that extends upward toward the end piece 9.

Similarly to the embodiment example in FIG. 2, projections 22 are positioned on the underside 25 of the cleat member 3 or of the connecting shanks 5. In this case, the projections 22 are positioned offset to corresponding projections in the lower support washers 17. Such an arrangement of the projections is also possible in the embodiment example shown in FIG. 2. Of course, corresponding projections 22 may be provided on only one side of the drive track 2, for example.

Figure 4:
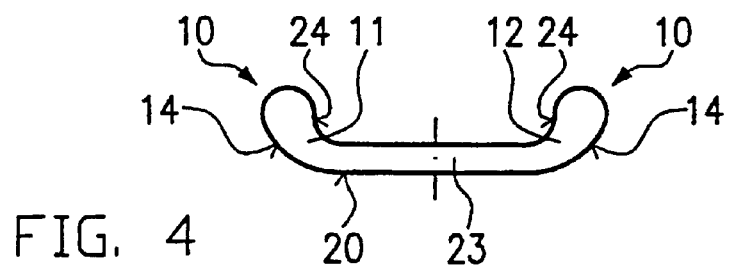
FIG. 4 a cross-sectional view through a support washer.
Figure 5:
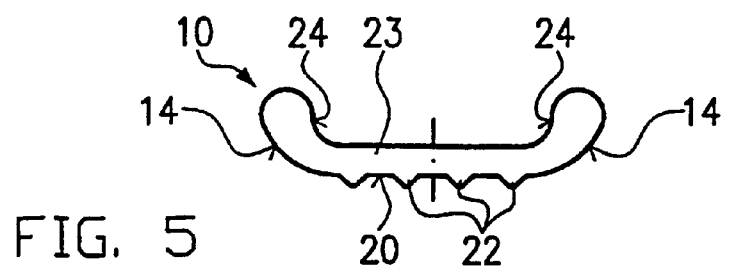
FIG. 5 a cross-sectional view similar to that in FIG. 4 through another embodiment of a support washer.

FIGS. 4 and 5 show the support washers 13, 17 separately and without the drive track 2 or cleat member 3. One should notice in this regard that an inner side 24 of the roll bead 10 may be so configured that it lies on an outer side of the U-shanks 7, 8, fitting to at least the upper support washer 13 which supports it. The support washer in FIG. 4 corresponds to the upper or lower support washer 13, 17 as shown in FIG. 1, and the support washer in FIG. 5 corresponds to the upper or lower support washer 13, 17 as shown in FIG. 2, or to the lower support washer 17 as shown in FIG. 3.

What is claimed is:

1. A cleat assembly (1) for drive tracks (2) of tracked vehicles with a cleat member (3) that includes an—in cross-section—essentially U-shaped base (4) from a connection shank (5) and two U-shanks (7,8) connected with the connection shank via a flex rim (6) that fit together and end opposite to the connection shank (5) by forming an end piece (9) of the cleat member (3) characterized in that the flex rim (6) includes a roll bead, the roll bead having a bend radius, that is projecting essentially outward from the connecting shank (5) and bent, upward toward the end piece (9), and further characterized in that the flex rim has a contour that is essentially tub-shaped with a flat bottom (23) and is formed with laterally arranged roll beads (10).

2. The cleat assembly according to claim 1, characterized in that the roll bead (10) is formed as a single piece with the cleat member (3).

3. The cleat assembly according to claim 1, characterized in that the roll bead is formed on at least one lateral end (11, 12) of an upper support washer (13) that may be positioned between the connecting shank (5) and the drive track (2).

4. The cleat assembly according to claim 1, characterized in that the roll bead (10) is formed on both sides of the cleat member (3).

5. A cleat assembly (1) for drive tracks (2) of tracked vehicles with a cleat member (3) that includes an—in cross-section—essentially U-shaped base (4) from a connection shank (5) and two U-shanks (7,8) connected with the connection shank via a flex rim (6) that fit together and end opposite to the connection shank (5) by forming an end piece (9) of the cleat member (3) characterized in that the flex rim (6) includes a roll bead, the roll bead having an application side, that is projecting essentially outward from the connecting shank (5) and bent upward toward the end piece (9), characterized in that the roll bead (10) is formed on its application side (14) toward the drive track (2) in a quarter-circle shape.

6. The cleat assembly according to claim 1, characterized in that the roll bead (10) is formed on both sides of the cleat member (3) with the same bend radius (15).

7. A cleat assembly (1) for drive tracks (2) of tracked vehicles with a cleat member (3) that includes an—in cross-section—essentially U-shaped base (4) from a connection shank (5) and two U-shanks (7,8) connected with the connection shank via a flex rim (6) that fit together and end opposite to the connection shank (5) by forming an end piece (9) of the cleat member (3) characterized in that the flex rim (6) includes a roll bead, the roll bead having a bend radius, that is projecting essentially outward from the connecting shank (5) and bent upward toward the end piece (9), characterized in that the bend radius (15) of the roll bead (10) is at least twice as great as the bend radius (16) of the flex rim (6).

8. The cleat assembly according to claim 1, characterized in that the cleat assembly (1) positioned opposing the cleat member (3) includes a lower support washer (17) and an upper support washer (13) so that the drive track (2) is positioned between the lower support washer and the cleat member (3) or the upper support washer (13).

9. The cleat assembly according to claim 8, characterized in that the lower support washer (17) includes at least one roll bead (10) on its lateral ends (18, 19) corresponding to the upper support washer (13) and is bent away from the drive track (2).

10. A cleat assembly (1) for drive tracks (2) of tracked vehicles wherein the cleat assembly includes a lower support washer and an upper support washer, the cleat assembly further including a cleat member (3) that includes an—in cross-section—essentially U-shaped base (4) from a connection shank (5) and two U-shanks (7,8) connected with the. connection shank via a flex rim (6) that fit together and end opposite to the connection shank (5) by forming an end piece (9) of the cleat member (3), characterized in that the flex rim (6) includes a roll bead, the roll bead having a bend radius, that is projecting essentially outward from the connecting shank (5) and bent upward toward the end piece (9), characterized in that the roll beads (10) are shaped the same on the upper and the lower support washers (13, 17).

11. The cleat assembly according to claim 8, characterized in that the upper support washer and the lower support washer (13, 17) include at least one projection (22) extending and at least partially projecting toward the drive track (2) and at least partially in the longitudinal direction (21) of the cleat assembly profile on its underside (20) in contact with the drive track (2).

12. The cleat assembly according to claim 1, characterized in that numerous projections (22) essentially parallel to one another are positioned on the underside (20).

13. The cleat assembly according to claim 8, characterized in that the upper support washer and the lower support washer (13, 17) are both essentially tub-shaped with a flat bottom (23) and is formed with laterally arranged roll beads (10).

14. A cleat assembly (1) for drive tracks (2) of tracked vehicles wherein the cleat assembly includes a lower support washer and an upper support washer, the cleat assembly further including a cleat member (3) that includes an—in cross-section—essentially U-shaped base (4) from a connection shank (5) and two U-shanks (7,8) connected with the connection shank via a flex rim (6) that fit together and end opposite to the connection shank (5) by forming an end piece (9) of the cleat member (3), characterized in that the flex rim (6) includes a roll bead, the roll bead having a bend radius, that is projecting essentially outward from the connecting shank (5) and bent upward toward the end piece (9), characterized in that the roll beads (10) of the upper support washer and the lower support washer (13, 17) are positioned with their inner sides (24) at. least partially on the outside of the U-shanks (7, 8).

15. The cleat assembly according to claim 8, characterized in that the bend radius (15) of the roll beads (10) is different at the ends (11, 12; 18, 19) of one of the upper support washer or lower support washer (13, 17) and/or at the upper:support washer and lower support washer (13, 17).

16. The cleat assembly according to claim 1, characterized in that the connecting shank (5) includes at least one projection (22) on its underside (25) facing the drive track (2).

17. The cleat assembly according to claim 1, characterized in that the roll bead (10) on the cleat member (3) includes an upper side (26) that is essentially flat and that extends toward the U-shanks (7, 8).

18. A cleat assembly (1) for drive tracks (2) of tracked vehicles wherein the cleat assembly includes a lower support washer and an upper support washer, the cleat assembly further including a cleat member (3) that includes an—in cross-section—essentially U-shaped base (4) from a connection shank (5) and two U-shanks (7,8) connected with the connection shank via a flex rim (6) that fit together and end opposite to the connection shank (5) by forming an end piece (9) of the cleat member (3), characterized in that the flex rim (6) includes a roll bead, the roll bead having a bend radius, that is projecting essentially outward from the connecting shank (5) and bent upward toward the end piece (9), characterized in that the projections (22) on the underside (25) of the connecting shank (5) or of the upper support washer (13) or the lower support washer (17) are positioned offset with respect to each other.

19. A cleat assembly (1) for drive tracks (2) of tracked vehicles wherein the cleat assembly includes a lower support washer and an upper support washer, the cleat assembly further including a cleat member (3) that includes an—in cross-section—essentially U-shaped base (4) from a connection shank (5) and two U-shanks (7,8) connected with the connection shank via a flex rim (6) that fit together and end opposite to the connection shank (5) by forming an end piece (9) of the cleat member (3), characterized in that the flex rim (6) includes a roll bead, the roll bead having a bend radius, that is projecting essentially outward from the connecting shank (5) and bent upward toward the end piece (9), characterized in that the upper support washer and lower support washer (13, 17) are shaped the same.

20. The cleat assembly according to claim 8, characterized in that the cleat member (3) and/or upper support washer (13) and/or lower support washer (17) include threaded holes (27) by means of which the cleat assembly (1) may be attached to the drive track (2).

* * * * *